United States Patent [19]

Frobenius

[11] 4,044,235
[45] Aug. 23, 1977

[54] METHOD AND APPARATUS FOR DETERMINING SMOOTH RUNNING OPERATION IN AN INTERNAL COMBUSTION ENGINE

[75] Inventor: Wolf-Dietrich Frobenius, Asperg, Germany

[73] Assignee: Robert Bosch GmbH, Stuttgart, Germany

[21] Appl. No.: 659,494

[22] Filed: Feb. 19, 1976

[30] Foreign Application Priority Data

Feb. 19, 1975  Germany .............................. 2507057

[51] Int. Cl.² .................... G06F 15/20; F02D 5/00
[52] U.S. Cl. .......................... 235/150.21; 123/32 EA
[58] Field of Search ............ 235/150.21; 123/32 EA, 123/32 AE

[56] References Cited

U.S. PATENT DOCUMENTS

| 3,789,816 | 2/1974 | Taplin et al. ............... 123/32 EA X |
| 3,820,198 | 6/1974 | Scofield ......................... 123/32 EA |
| 3,863,054 | 1/1975 | Monpetit ....................... 235/150.21 |
| 3,927,304 | 12/1975 | Wentworth et al. ........... 235/150.21 |
| 3,953,716 | 4/1976 | Monpetit ....................... 235/150.21 |

*Primary Examiner*—Jerry Smith
*Attorney, Agent, or Firm*—Edwin E. Greigg

[57] ABSTRACT

Engine control based on the smooth or rough running of the engine is performed by obtaining a signal indicative of crankshaft rotation and by digital measurement of the period of revolution. The periods of three successive revolutions are compared to obtain a second differential, related to acceleration and hence to combustion chamber pressure. This second differential is compared digitally to a nominal value, taken from an rpm-dependent function of the engine smoothness, derived by frequency synthesis of the frequencies from individual stages in one or more of the counters.

12 Claims, 5 Drawing Figures

METHOD AND APPARATUS FOR DETERMINING SMOOTH RUNNING OPERATION IN AN INTERNAL COMBUSTION ENGINE

BACKGROUND OF THE INVENTION

The invention relates to a method and apparatus for measuring the smooth running operation of an internal combustion engine, especially for controlling the engine to operate at its lean running limit.

Great effort is expended nowadays to permit the operation of internal combustion engines in a domain in which the exhaust gases are free of noxious components and/or the fuel consumption is as small as possible so as to comply with increasingly rigid regulations regarding exhaust gas concentrations and so as to take account of the overall fuel supply situation and, in general, to operate a motor vehicle in economical manner.

One possibility to achieve these aims is to operate the engine with as lean a fuel-air mixture as possible, i.e., to adjust the engine in the direction of a lean mixture because, in that region, one may expect a relatively innocuous exhaust gas and low fuel consumption, although the concentration of nitrogen oxides would tend to increase. For this reason, it is of great significance to know, as precisely as possible, what the lean-running limit of the engine is. This determination may be made, for example, on the basis of the fluctuations of the cylinder pressure in the engine. It is known that an internal combustion engine runs less smoothly the farther away its operation is from a stoichiometric fuel-air ratio (air number $\lambda = 1$).

The invention generally derives from the recognition that the pressure fluctuations in the cylinders result in the change of the torque exerted by each cylinder on the crankshaft and, hence, in fluctuations of the rotational speed of the crankshaft itself. Thus, the rpm fluctuations of the crankshaft may be used as a means to measure the smoothness of the operation of the engine.

The following derivation will aid in the understanding of the relevant phenomena:

Let
- $M$ = engine torque
- $T$ = period of crankshaft revolution
- $\theta$ = moment of inertia
- $\omega$ = angular crankshaft speed (taken equal to engine r.p.m.)

The following equation holds generally:

$$MT = \theta \cdot \Delta\omega \quad (1)$$

Now
$$\omega_1 = 360°/T_1$$

and
$$\omega_2 = 360°/T_2$$

$$\Delta\omega = \omega_1 - \omega_2 = 360° \frac{(T_1 - T_2)}{T_1 T_2} = \quad (2)$$

$$\frac{360°}{T^2} \cdot \Delta T \text{ if } T_1 \approx T_2$$

Thus, from equation 1, $$\Delta M \cdot T = \theta \cdot (\Delta\omega)$$

and using equation 2, $$\Delta M \cdot T = (\theta \, 360°/T^2) \, \Delta (\Delta T)$$

so that, finally $$\Delta M \propto \Delta(\Delta T)/T^3$$

i.e., the fluctuations of torque are proportional to the function $\Delta(\Delta T)/T^3$.

Thus, a measure of the smoothness of operation of an internal combustion engine is given by the value $$\Delta(\Delta T)$$

which can be derived from three sequential periods of revolution of the crankshaft according to the following formula $$\Delta(\Delta T) = (T_i - T_{i+1}) - (T_{i+1} - T_{i+2})$$

As shown by the right-hand term in the above equation, the rough-or smoothness $\Delta(\Delta T)$ may be derived from three sequential periods of revolution of duration T.

OBJECT AND SUMMARY OF THE INVENTION

It is a principal object of the invention to provide a method and an apparatus for determining the smoothness value $\Delta(\Delta T)$ for an internal combustion engine with relatively simple electronic circuitry.

This object is attained, according to the invention, based on the method referred to above, by providing that the rpm fluctuations of the engine are measured in three sequential crankshaft revolutions. For this purpose, a predetermined counter frequency is provided to a first up-counter and a third up-counter during each period of revolution. Twice this counter frequency is provided to a second down-counter. After the completion of each revolution, each of the counter contents is transferred to the following counter and the first up-counter is reset to zero.

A particularly advantageous feature of the invention is that the output of the third counter, embodied as an up-counter, directly generates the desired output value $$\Delta(\Delta T)$$

which is a measure of the smoothness of the engine and which is provided at the end of each crankshaft revolution, or at the end of each period. A further particular advantage is that the required counter size is not determined by some absolute counter value but merely by the maximum value of the prevailing value of $\Delta(\Delta T)$ so that, on the one hand, one can use a very high frequency to obtain good resolution and, on the other hand, the amount of circuitry need not be very great, as will be explained in greater detail.

Another embodiment of the invention provides using the derived smoothness value for performing a digital engine control at the lean-running limit.

The invention will be better understood as well as further objects and advantages thereof become more apparent from the ensuing detailed specification of two exemplary embodiments taking in conjunction with the drawing.

DESCRIPTION OF THE PREFERRED EMBODIMENTS

Figure 1:
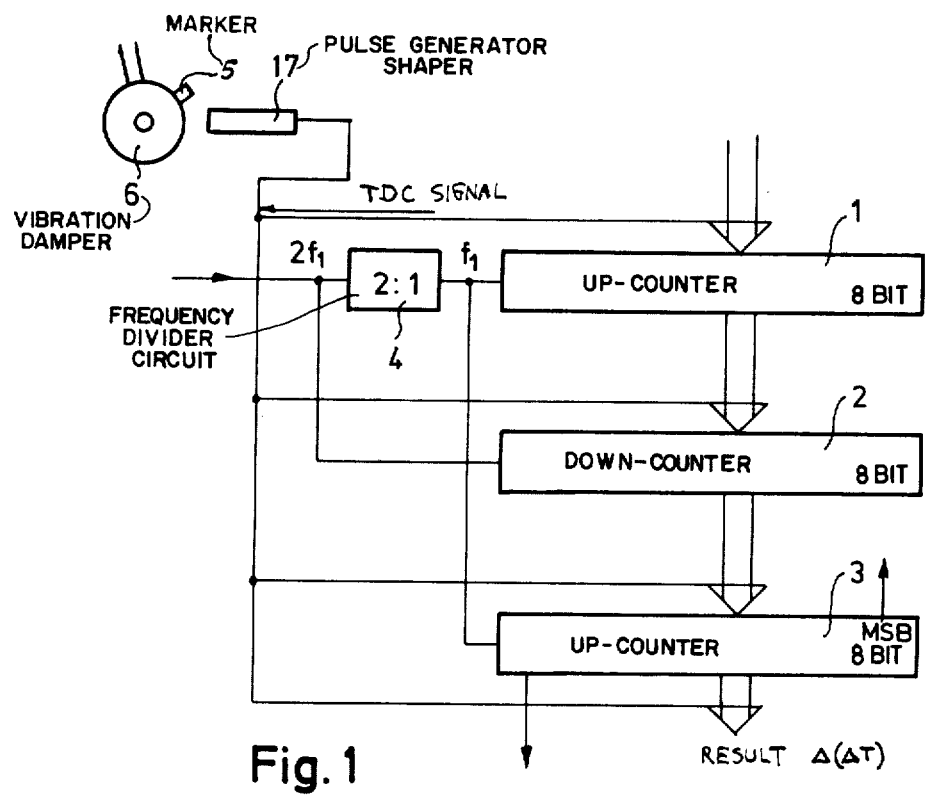
FIG. 1 is a schematic block diagram of a first exemplary embodiment of the invention.

FIG. 1 is a block circuit diagram of a digital circuit for forming the difference of sequential periods of rotation, namely the above referred-to value $\Delta(\Delta T)$ for defining the smoothness of operation of an internal combustion engine. The circuit also provides the correct algebraic sign.

The above cited formula for the smoothness value $\Delta(\Delta T)$ may be resolved to obtain the following formula: $\Delta(\Delta T) = T_i - 2T_{i+1} + T_{i+2}$. $T_i$, $T_{i+1}$ and $T_{i+2}$ are the time periods of three sequential crankshaft revolutions. Using this equation, one needs only three especially configured counters 1, 2 and 3 and, after the completion of each crankshaft revolution, the content of the last counter 3 directly represents the desired result of engine smoothness $\Delta(\Delta T)$.

In particular, the first counter is an up-counter which is provided with a relatively high frequency $f_1$, in the general region of 1 - 2 megahertz. This same frequency $f_1$ is provided as a clock frequency to the last counter 3 which is also an up-counter.

A frequency $f_2$ equal to twice the first counter frequency $f_1$ is provided to the intermediate counter 2 which is embodied as a down-counter only. The two required frequencies $f_1$ and $f_2$ are generated by using a system clock frequency having the frequency $2f_1$ which is divided in a known frequency divider circuit 4 in the ratio 2:1 and the output of this frequency divider circuit 4 is connected to the counting inputs of counters 1 and 3. The various input and output lines from the counters are so connected that, at any particular point in time, the content of counter 1 may be transferred to counter 2 and, similarly, the content of counter 2 may be transferred to counter 3. In other words, at the end of each crankshaft revolution the content of the up-counter 1 is transferred in parallel as the initial content of the down-counter 2. In similar manner, the content of the down-counter 2 is transferred in parallel as the initial counting value of the up-counter 3. Thus, only the first up-counter 1 starts each interval with the value zero.

The timing of the counting start and the transfer of contents is controlled by an rpm synchronous signal, obtained, for example at the top dead piston center. Such a signal may be derived, for example, by the inductive cooperation of a crankshaft marker 5 affixed to the vibration damper 6 and a pulse generator and shaper 17.

Thus, such a circuit, in which only the intermediate down-counter 2 gets the double counting frequency, and employing data transfer, causes the output count of the last counter 3 to be exactly equal to the right hand term of the last-mentioned equation in which this term is equal to the smoothness value $\Delta(\Delta T)$.

It is a particular advantage of such a circuit that a very small number of bits in each counter is sufficient, because, in general, the differences in r.p.m. or period of any three sequential crankshaft revolutions are probably not very great. On the other hand, however, the counter frequency must be made very high so as to obtain a sufficiently precise resolution. If the individual counters 1, 2 and 3 were so embodied that they had to fully store and show the counted numbers obtained during very low r.p.m., they would have to have extremely high counting capabilities, of up to or more than 16 bits. However, even at very high counter frequencies, it is only the differences of the counters that are of interest and not their absolute value, since by forming the difference, these values would become relatively small again.

Thus, the capacities of each counter 1, 2 and 3 may be quite low; for example, to obtain a resolution of 1 microsecond one needs a counter size of only 8 - 9 bits per counter which includes the algebraic sign of the smoothness value $\Delta(\Delta T)$. Of course, one has to accept the fact that, in the case when fairly high counter frequencies are used, each counter will overflow, possibly several times. But this is of no consequence for the correct operation, provided that the capacity of each counter is sufficient to store the maximum value of any prevailing magnitude of smoothness $\Delta(\Delta)$. Thus, even when very high counter frequencies are used, it is possible to get by with 8 - 9 bits per counter, i.e., a total of 27 counting stages. The algebraic sign of $\Delta(\Delta T)$ is obtained from the most significant bit (MSB) of the last counter 3.

Figure 2:
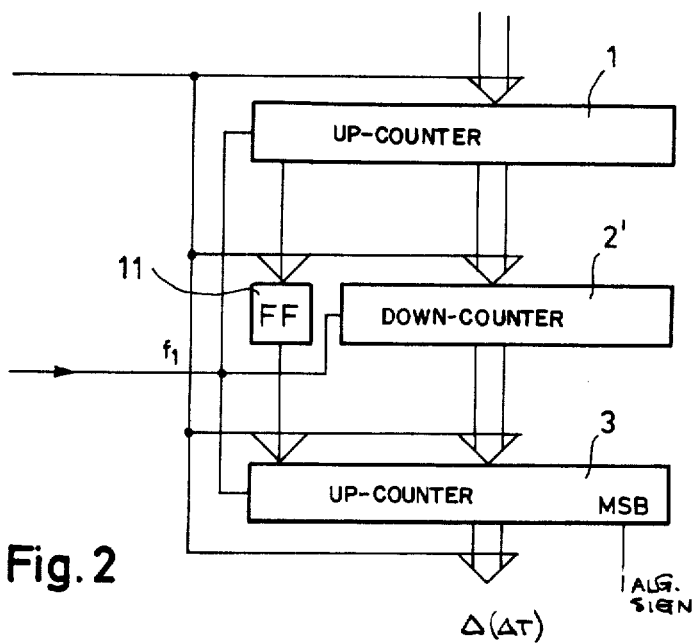
FIG. 2 is a similar block diagram of a second exemplary embodiment of the invention.

FIG. 2 illustrates a second exemplary embodiment of the invention. This embodiment is derived from the consideration that, if one looks at the down-counter 2 in the first exemplary embodiment more closely, one sees that its lowest counting stage, i.e., that stage which is coupled immediately to the counter frequency $2f_1$, actually only always shows that value, after predetermined periods of time, which it receives in parallel from counter 1 at the start. And, hence, this lowest stage need not even be triggered by the frequency $2f_1$ but one may proceed as shown in the modification of FIG. 2 and control the second lowest counting stage of counter 2 directly, but at the frequency $f_1$. In this manner, one can dispense with the frequency divider circuit 4 shown in FIG. 1. The lowest counting stage of the down-counter 2, represented in the second embodiment of FIG. 2 as the down-counter 2', need then only perform the function of a storage flip-flop. Thus, the system shown in FIG. 2 may be driven at a single frequency $f_2$ and, by increasing the frequency $f_1$ appropriately, one can also enhance the power of resolution. As is generally done in digital technology, the algebraic sign of the result may be determined from the value of the MSB. Using the circuit of FIG. 1 or 2, the invention further provides a control system for the engine, shown in FIG. 3, which is so embodied that the derived value of the smoothness is used to determine the lean-running limit of the internal combustion engine. The circuit further performs a comparison of nominal command values with the actual value and finally performs an operational control of the engine in the sense that, at each operating condition, it engages the fuel supply system. The circuit of FIG. 3 may thus be used as a smooth-running limit controller which generates a control signal that can be processed by any known fuel control system.

As has been explained above, the circuits in FIGS. 1 and 2 are able to provide a measure of the absolute smoothness of the rotation of the internal combustion engine. In order to use this value for engine control, these measured values of $\Delta(\Delta T)$ must be compared continuously with a set-point value and a correction datum must be provided when the comparison indicates that the set point value is exceeded. However, it is also clear that this set point value cannot be a constant provided in advance, because the engine smoothness is necessarily different at different engine speeds so that the set-point values may also be changed appropriately.

The foregoing observation is easily understood when considering that, at low rpm (large period), the power strokes at the crankshaft occur at greater time intervals, so that, for this reason alone, at low rpm, one would have to accept a greater set point value, i.e., one would have to accept an increased degree of engine roughness.

Figure 4:
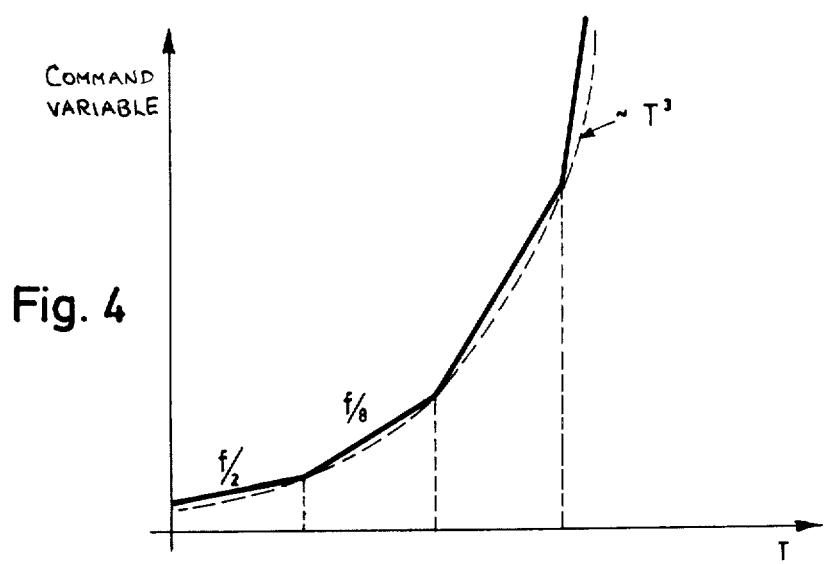
FIG. 4 is a diagram showing the dependence of the nominal smoothness value on rpm or period of rotation.

FIG. 4 is a diagram showing the dependence of the set point value of engine roughness as a function of the period. It may be seen that this set point value depends on rpm $n$ as a function of $1/n^3$.

Figure 3:
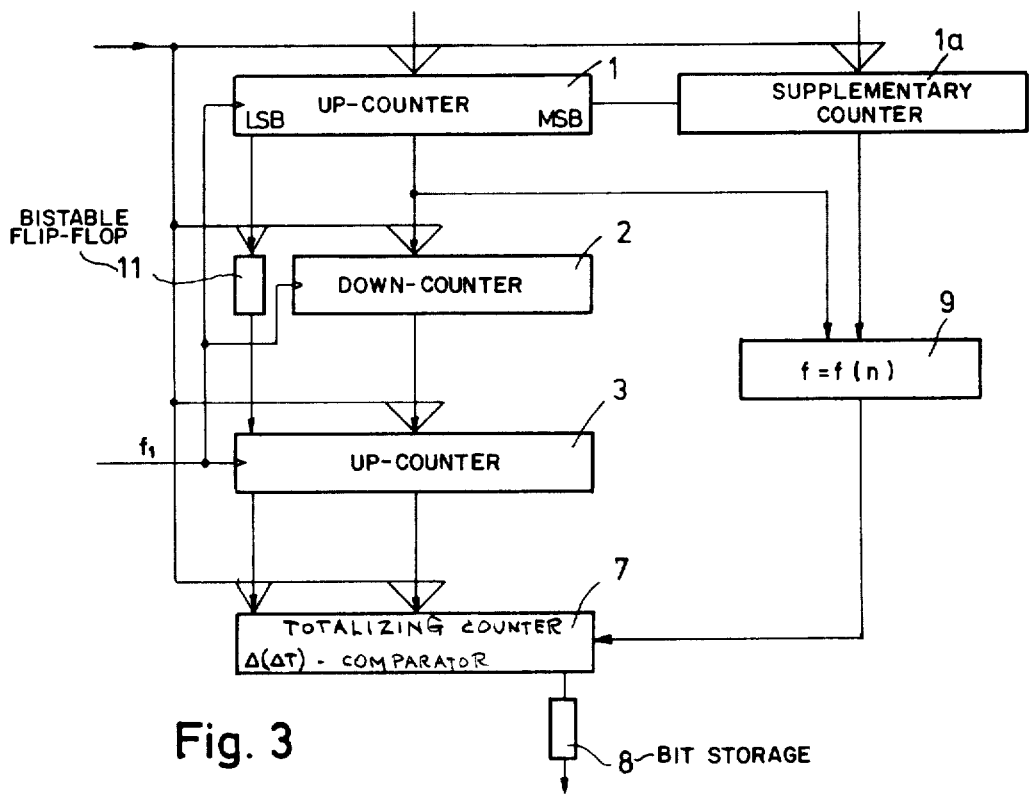
FIG. 3 is a block diagram of a control circuit for holding the engine in its lean-running limit region.

The improvement of the invention illustrated in FIG. 3 is able, in a particularly advantageous and simple manner, to perform the above-mentioned comparison of the actual value with the set-point value and, furthermore, the set-point value may be represented in rpm-dependent manner, according to practically any desired functional relationship.

To perform this task, the first up-counter 1 in the circuits of FIGS. 1 and 2 is enlarged by a certain number of bits, for example by the addition of a supplementary counter 1a. The expansion of counter size is such that the counter 1 and the supplementary counter 1a are able to count the longest period, for example at $n = 1,000$ rpm. Since the counters 1 and 1a count continuously, their individual counting stages continuously show as many different partial frequencies as there are stages, so that by suitable choice of the partial frequencies which are available, one can select one or, if necessary, several of these frequencies which approximate an rpm-dependent set point signal and are then supplied in a predetermined time interval to the above-mentioned set-point counter for generating an rpm-dependent set point. However, advantageously, these rpm-dependent frequencies (compare also FIG. 5 which has a schematic picture of one possibility for generating an rpm-dependent frequency) are used immediately for counting down a totalizing counter 7, which is thus counted down at different intervals with different frequencies. The totalizing counter 7, in which the comparison of set point value and the actual value is made, is connected behind the last up-counter 3 and controlled, for example, by the top dead center signal, accepts the content of the counter 3 and holds it for the duration of one period in which the comparison is made by counting down at the appropriate rpm-dependent frequency. Thus, it is possible to perform the adjustment of the set point value, on the one hand and, also, to perform the comparison between the set point and actual values in the same counter by counting the totalizing counter down. If this counter exceeds its zero content, then the set point value had not been exceeded. If the zero content is not reached then the set point was exceeded by the actual value. This state of affairs is signaled by the MSB and is stored for one revolution in a subsequent one bit storage 8.

Thus, the value of the MSB in the totalizing counter makes it possible to determine whether the set point value was exceeded during the rpm-dependent countdown of the totalizing counter and this value is taken over into the bit storage 8. The number of times when the set point value was exceeded in one direction or the other then gives an indication in which direction the fuel supply should be changed by the fuel quantity controller. For this reason, an integrating stage is connected to the output of the bit storage 8, or the bit storage immediately effects an integrating final control element. In known systems for fuel injection, the output of the integrating final element can engage immediately a multiplier stage for shortening or lengthening the fuel injection pulses.

Thus, in the exemplary embodiment of FIG. 3, a computation is first made and the $\Delta(\Delta T)$ value for the engine roughness is determined by the counters 1, 2 and 3. In the next time period, the apparatus performs the rpm-dependent frequencies election and makes the comparison between set point and actual values. However, the great rapidity of operation of the entire system, which operates in an rpm-synchronous manner, makes this delay insignificant.

FIG. 4 is a diagram which illustrates how the counting frequencies for the totalizing counter 7 change as a function of the period T and how the theoretical curve for the set point function given in dotted lines is thereby approximated.

The following will illustrate how the rpm-dependent frequency, which is generated in a circuit shown in FIG. 3 by the block 9, is formed in detail.

Figure 5:
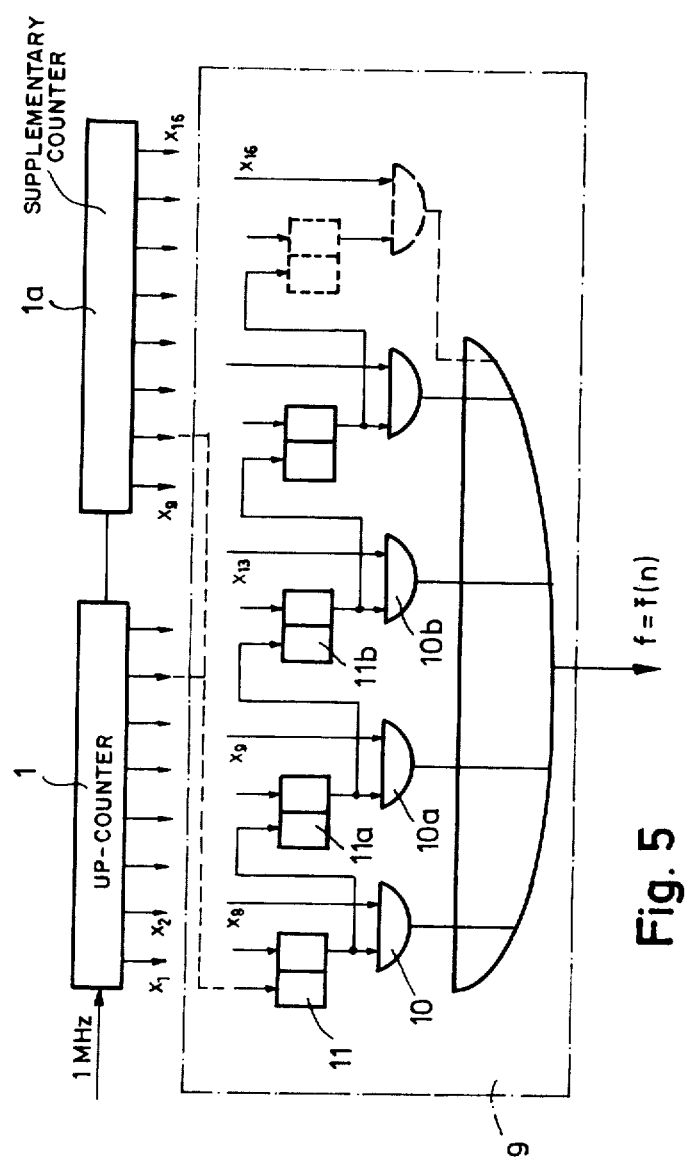
FIG. 5 is a block circuit diagram for generating a simulated nominal smoothness value by frequency synthesis.

The individual counter positions of the main counter 1 and the supplementary counter 1a in the exemplary embodiment illustrated in FIG. 5 carry sixteen different partial frequencies which are here designated by X1, X2, ... X16. If the counter 1 receives a frequency of 1 MHz, then X1 is equal to 500 KHz, X2 equal to 250 KHz, etc.

The selected frequencies $X_8$, $X_9$, $X_{13}$ and $X_{16}$ in the illustrated exemplary embodiment travel to AND gates 10, 10a, 10b, etc., whereas the other inputs of the AND gates are controlled by bistable flip-flops 11, 11a, 11b, etc. These flip-flops, in turn, are triggered by the outputs of the individual counting stages. What is substantial is that the set point value is generated in an rpm-dependent manner and since, in the preferred exemplary embodiment of the invention, the set point is, so to speak, simulated by an rpm-dependent frequency, this frequency must also be chosen to be rpm-dependent. However, the appearance to outpus signals at the outputs of the individual counting positions of the counter 1 and the supplementary counter 1a is already rpm-dependent because, the beginning and end of a counting period, as described above, is supervised by the top dead center signal of the crankshaft. Thus, the only thing that is required is to use the counter contents themselves as switching data for the bistable flip-flops 11, 11a, 11b. Further individual details of the circuit need not be given because the connections of the inputs of the flip-flops 11, 11a, 11b to the respective outputs of the counter stages depend on the choice of the particular set point value. In general, the output of one switching flip-flop 11, 11a always controls one of the inputs of the following flip-flop.

What is claimed is:

1. A process for obtaining a signal for controlling the operation of an internal combustion engine, said engine including a crankshaft, and a fuel supply system, comprising the steps of:
   measuring the period of successive crankshaft revolutions;
   during each crankshaft revolution, counting a first frequency in a first counter in increasing numerical sense, counting a second frequency in a second counter in decreasing numerical sense, said second frequency being equal to twice said first frequency, and counting said first frequency in a third counter in increasing numerical sense; and at the termination of each revolution, transferring the contents of said first counter to said second counter and resetting said first counter to zero; and transferring the contents of said second counter to said third counter before the contents of the first counter are transferred to the second counter.

2. A process as defined by claim 1, wherein said second frequency is the primary frequency derived from measuring the crankshaft revolutions.

3. A process as defined by claim 1, further comprising the steps of:

at the termination of each revolution, transferring the contents of said third counter to a fourth counter and counting in said fourth counter, in the decreasing numerical sense, an r.p.m. dependent frequency derived from partial frequencies present in an extension counter connected to said first counter.

4. An apparatus for obtaining a signal for controlling the operation of an internal combustion engine, said engine including a crankshaft, and a fuel supply system, the apparatus comprising:

means for generating a pulse train proportional to crankshaft rotation and connected to a first and second digital counter and to a third counter;

means for generating a datum pulse indicative of a particular angular crankshaft position;

a first digital counter clocked at a first frequency and gated by said datum pulse;

a second digital counter, clocked at a frequency equal to twice said first frequency and gated by said datum pulse; and a third counter, clocked at said first frequency and gated by said datum pulse; the contents of said first counter being transferred in parallel to said second counter and the contents of said second counter being transferred in parallel to said third counter at times defined by said datum pulse.

5. An apparatus as defined by claim 4, wherein said first counter is reset to zero by said datum pulse, thereby defining the onset of counting.

6. An apparatus as defined by claim 4, wherein the lowest stage of said second counter is a storage flip-flop which receives the content of the lowest stage of said first counter and transfers it to the lowest stage of said third counter and wherein the next to lowest stage of said second counter is clocked at the same frequency as the lowest stages of said first and third counters.

7. An apparatus as defined by claim 4, further comprising:

a fourth counter connected to receive the contents of said third counter; and a fifth counter for providing a nominal value to said fourth counter, said fourth and fifth counters being clocked at a constant frequency, thereby performing a comparison between a nominal and an actual value.

8. An apparatus as defined by claim 7, wherein said nominal value is r.p.m. dependent and is derived in said fifth counter by supplying to it a counting frequency chosen in dependence on engine r.p.m.

9. An apparatus as defined by claim 4, further comprising:

a supplementary counter associated with said first counter to provide higher counting stages thereto and to increase the capacity of said first counter to include the longest probable period of crankshaft revolution, and further comprising a connective circuit for receiving the contents of said first counter and said supplementary counter and a totalizing counter clocked by the output frequency from said connective circuit in dependence on r.p.m. and receiving the contents of said third counter, thereby performing a comparison of the nominal period with the actual period of crankshaft revolution said nominal period being that period associated with the output from said supplementary counter and said actual period being that period associated with the output of said third counter.

10. An apparatus as defined by claim 9, further comprising:

digital storage means for storing the algebraic sign of the deviation from the nominal value remaining in said totalizing counter and an integrating circuit connected to said storage means.

11. An apparatus as defined by claim 10, wherein the output of said integrating circuit is connected to the multiplying input of the fuel supply system of the internal combustion engine, thereby changing the duration of the fuel injection control pulses.

12. An apparatus as defined by claim 10, wherein said connective circuit includes a plurality of AND gates, each associated with one of a plurality of bistable flip-flops, the inputs of said flip-flops being controlled by the contents of said first counter and said supplementary counter and a second input in each of said AND gates being connected with suitable ones of the stages of said first counter and said supplementary counter.

* * * * *